(12) United States Patent
Furlan

(10) Patent No.: US 8,073,321 B2
(45) Date of Patent: Dec. 6, 2011

(54) CONTROLLING AN EXPOSURE TIME FOR DIGITAL CAMERAS

(75) Inventor: John Louis Warpakowski Furlan, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 210 days.

(21) Appl. No.: 12/193,636

(22) Filed: Aug. 18, 2008

(65) Prior Publication Data

US 2009/0052878 A1 Feb. 26, 2009

Related U.S. Application Data

(63) Continuation of application No. 11/193,054, filed on Jul. 29, 2005, now Pat. No. 7,428,378.

(51) Int. Cl.
G03B 15/03 (2006.01)

(52) U.S. Cl. ........................................................ 396/157

(58) Field of Classification Search ................. 396/157, 396/194, 355, 357, 452, 456, 479, 158
See application file for complete search history.

(56) References Cited

U.S. PATENT DOCUMENTS

| | | | |
|---|---|---|---|
| 4,305,647 A | 12/1981 | Ishida | |
| 4,999,663 A * | 3/1991 | Nakamura | 396/89 |
| 5,483,319 A * | 1/1996 | Sakamoto et al. | 396/158 |
| 5,619,266 A | 4/1997 | Tomita et al. | |
| 5,758,220 A | 5/1998 | Miyadera | |
| 6,272,292 B1 * | 8/2001 | Iwasaki et al. | 396/157 |
| 6,385,122 B1 | 5/2002 | Chang | |
| 6,404,991 B2 | 6/2002 | Gfeller | |
| 6,424,556 B1 | 7/2002 | Kablanian et al. | |
| 6,466,504 B1 | 10/2002 | Roy | |
| 6,483,094 B1 | 11/2002 | Yahav et al. | |
| 6,885,405 B1 | 4/2005 | Steinberg et al. | |
| 7,019,780 B1 | 3/2006 | Takeuchi et al. | |
| 7,075,578 B1 | 7/2006 | Kubo | |
| 7,126,629 B1 | 10/2006 | Braunstein et al. | |
| 7,428,378 B1 | 9/2008 | Warpakowski Furlan | |
| 2001/0055064 A1 | 12/2001 | Minakami | |
| 2002/0021901 A1 | 2/2002 | Shimizu | |
| 2002/0061192 A1 * | 5/2002 | Kawasaki et al. | 396/182 |
| 2002/0080245 A1 | 6/2002 | Parulski et al. | |

(Continued)

FOREIGN PATENT DOCUMENTS

WO    WO 01/69651    9/2001

OTHER PUBLICATIONS

Litwiller, "CCD vs. CMOS: Facts and Fiction," Photonics Spectra, 4 pgs., Jan. 2001.

(Continued)

*Primary Examiner* — Clayton E Laballe
*Assistant Examiner* — Warren Fenwick
(74) *Attorney, Agent, or Firm* — Patterson & Sheridan, LLP

(57) ABSTRACT

Various methods, apparatuses, and systems in which a digital photography device includes a global shutter to control exposure time, a sensor array, and a flash illumination are described. The global shutter is in the optical path of light going to the sensor. The flash illumination generates a pulsed illumination. The shutter speed of the global shutter during a pre-flash illumination substantially matches the shutter speed during the flash illumination during the taking of a picture using the flash illumination based on the global shutter receiving a trigger signal from a controller.

10 Claims, 10 Drawing Sheets

U.S. PATENT DOCUMENTS

| | | |
|---|---|---|
| 2002/0113881 A1 | 8/2002 | Funston et al. |
| 2002/0154232 A1 | 10/2002 | Tull |
| 2002/0158987 A1 | 10/2002 | Shimizu |
| 2002/0164160 A1 | 11/2002 | Fredlund et al. |
| 2002/0196345 A1 | 12/2002 | No |
| 2003/0025822 A1 | 2/2003 | Shimada |
| 2003/0052989 A1 | 3/2003 | Bean et al. |
| 2004/0081446 A1* | 4/2004 | Compton ............ 396/362 |
| 2004/0223075 A1* | 11/2004 | Furlan et al. ............ 348/363 |
| 2005/0190274 A1 | 9/2005 | Yoshikawa et al. |
| 2005/0213957 A1 | 9/2005 | Tokunaga |
| 2005/0253940 A1 | 11/2005 | Chiba et al. |
| 2005/0263599 A1 | 12/2005 | Zhu et al. |
| 2006/0118627 A1 | 6/2006 | Joseph et al. |
| 2006/0228108 A1* | 10/2006 | Viinikanoja et al. .......... 396/457 |
| 2006/0267053 A1 | 11/2006 | Yang et al. |
| 2006/0274171 A1 | 12/2006 | Wang |

OTHER PUBLICATIONS

Shutter Operations for CCD and CMOS Image Sensors, Image Sensor Solutions, Eastman Kodak Company, Application Note, MTD/PS-0259, Revision 1, Oct. 23, 2001.

Wany, "High Dynamic CMOS Image Sensors," G.I.T. Imaging & Microscopy, pp. 26-28, G.I.T. Verlag, Germany, Mar. 2001.

Xu et al., "Dual Frequency Cholesteric Light Shutters", American Institute of Physics, Appl. Phys. Lett. vol. 70, No. 6, Feb. 10, 1997.

* cited by examiner

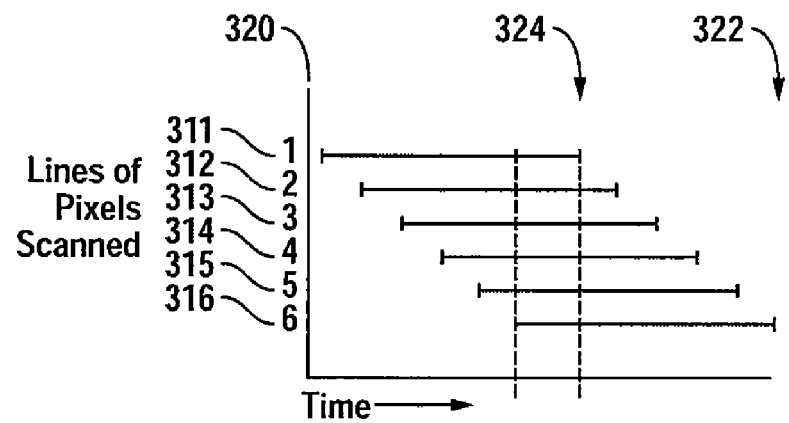
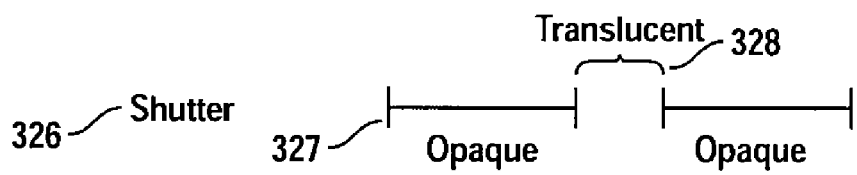
FIG. 3
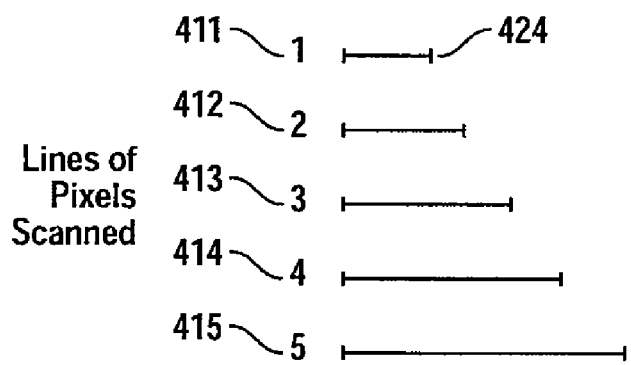
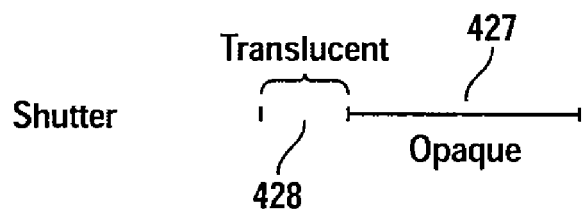
FIG. 4

CONTROLLING AN EXPOSURE TIME FOR DIGITAL CAMERAS

CROSS-REFERENCES TO RELATED APPLICATIONS

The present application is a continuation of U.S. patent application Ser. No. 11/193,054, filed on Jul. 29, 2005, entitled "Controlling an Exposure Time for Digital Cameras," the disclosure of which is hereby incorporated by reference in its entirety for all purposes.

FIELD OF THE INVENTION

Embodiments of the invention generally relate to digital photography devices. More particularly, an aspect of an embodiment of the invention relates to still-image exposure management for digital photography devices.

BACKGROUND OF THE INVENTION

Digital cameras sample the light that bounces off a subject to create a digital image. A digital camera may use a shutter in combination with a sensor to determine an exposure time and acquire the proper amount of light to make a good image. The proper amount of light may come from accumulating ambient light over time until the proper amount of light is obtained. Alternatively, the addition of artificial light from a flash reduces the amount of time to obtain the proper amount of light to make a good image.

A pre-flash may be used to predict the amount of flash needed during the exposure of the picture to obtain good image quality. The illumination using pre-flash and ambient light can be compared to illumination with ambient light alone to determine the amount of flash illumination needed during exposure of the picture.

Some digital cameras use a different image sensor for taking the picture with the flash and for measuring illumination during the pre-flash time period. A sensor array such as a complementary metal-oxide semiconductor (CMOS) sensor or a Charge Coupled Device (CCD) sensor may have a limited dynamic operating range in order to make a good image.

CMOS sensors implementing a rolling shutter timing mechanism may have a relatively slow exposure time when a flash is required. Often, in a scene having ambient light, the slow exposure time results in a blurry photograph for a hand-held camera due to camera motion during the time the shutter is open. In a sensor implementing a rolling shutter, the light accumulating pixels in the sensor both track the accumulation of charge and are read out in a pixel line by pixel line manner. Since the integration process moves through the sensor pixel lines over some length of time, some motion artifacts may become apparent. For example, if a vehicle is moving through the image during capture, then light from the top of vehicle will be integrated at some earlier time than light from the bottom of the vehicle, causing the bottom of the vehicle to appear slanted forward in the direction of motion.

Some digital cameras have a mechanical shutter mechanism used during the flash to reduce the exposure time of the CMOS sensor and reduce blurring of the image. Unfortunately, the typically long exposure time during the pre-flash can lead to an inaccurate prediction of the flash needed for taking the picture with a short exposure time. The CMOS sensor with a limited dynamic operating range may become clipped or flooded with light and produce poor images in response to a non-ideal flash.

SUMMARY OF THE INVENTION

Various methods, apparatuses, and systems in which a digital photography device includes a global shutter, a sensor array, and a flash are described. The global shutter is in the optical path of light going to the sensor. The flash generates pulsed illumination. The shutter speed of the global shutter during a pre-flash illumination substantially matches the shutter speed during the taking of a picture using the flash illumination based on the global shutter receiving a trigger signal from a controller.

BRIEF DESCRIPTION OF THE DRAWINGS

The drawings refer to embodiments of the invention in which:

FIG. 3 illustrates a graph of an embodiment of lines of pixels in the sensor accumulating charge from light striking each pixel in the lines of the sensor array versus time for a shutter implementing a rolling timing mechanism;

FIG. 4 illustrates a graph of an embodiment of lines of pixels in the sensor accumulating charge while the picture is being taken versus time for a shutter implementing a global reset mechanism;

Figure 1:
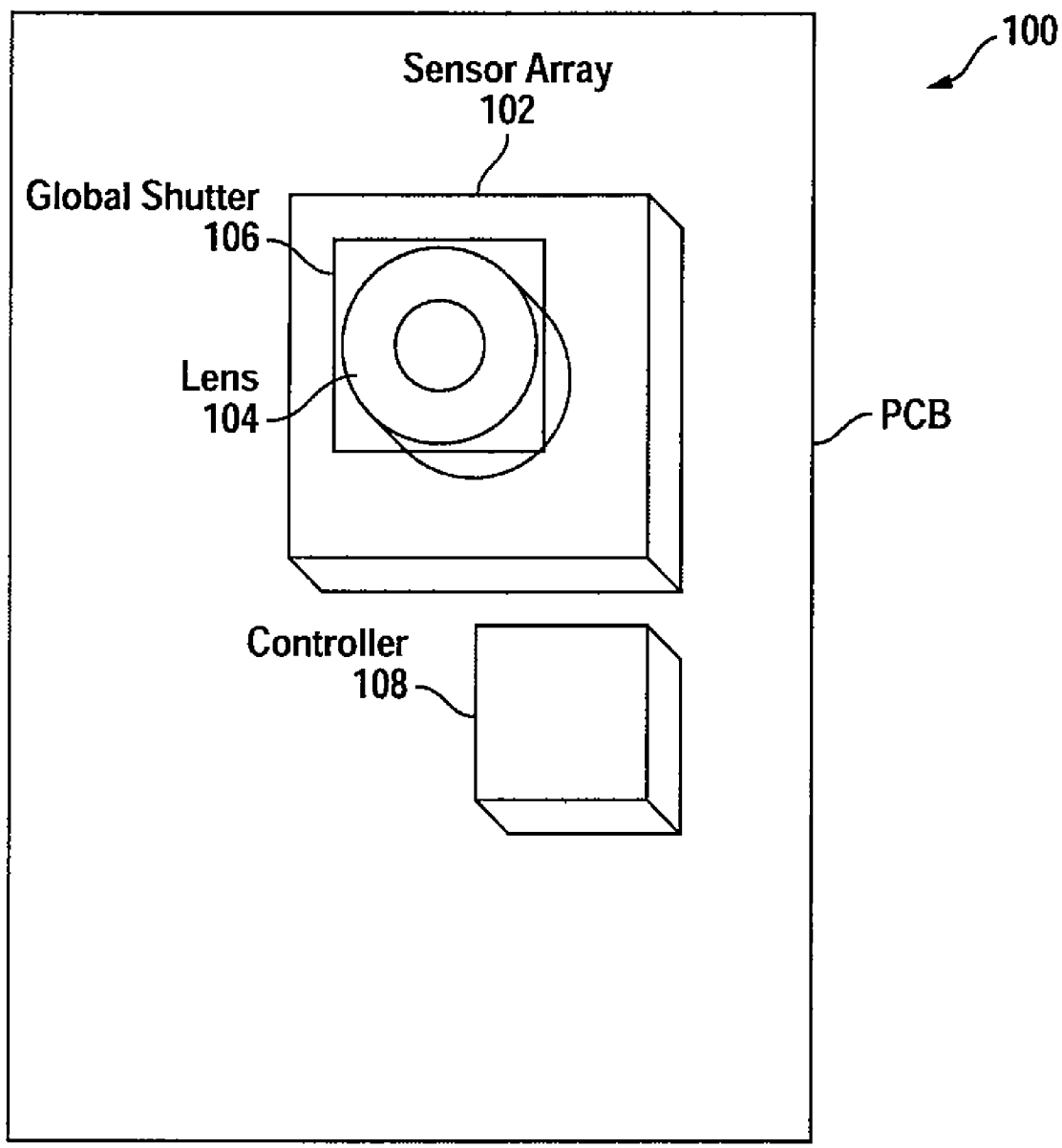
FIG. 1 illustrates an assembly diagram of a portion of an embodiment of a digital photography device that focuses incoming light onto a light sensitive sensor array through a global shutter.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DESCRIPTION OF SPECIFIC EMBODIMENTS

In the following description, numerous specific details are set forth, such as examples of specific optical paths, named components, connections, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first time period, may be made. However, the specific numeric reference should not be interpreted as a literal sequential order but rather interpreted that the first time period is different from a second time period. Thus, the specific details set forth are merely exemplary. The specific details may be varied from and still be contemplated to be within the spirit and scope of the present invention.

In general, various methods, apparatuses, and systems are described in which a digital photography device includes a global shutter, a sensor array, and a flash. The global shutter controls the exposure time during the taking of the picture. The global shutter is in an optical path of light going to the sensor array. The flash generates a pulsed illumination during the taking of the picture. The shutter speed of the global shutter during a pre-flash illumination substantially matches the shutter speed during the flash illumination when taking a picture using the flash illumination based on the global shutter receiving a trigger signal from a controller.

FIG. 1 illustrates an assembly diagram of a portion of an embodiment of a digital photography device that focuses incoming light onto a light sensitive sensor array through a global shutter. The digital photography device 100, such as a digital camera, may focus incoming light onto a light-sensitive sensor array 102 through a lens 104 and a global shutter 106.

The global shutter 106 may be mechanical such as a plastic shutter mechanism used in a charge coupled device array (CCD). The global shutter 106 may also be electronic in nature such that light data is accumulated in a buffer for merely a preset amount of time. The global shutter 106 is in the optical path of light going to the sensor array. A mechanical global shutter can be opened to globally expose pixels in the sensor array to light at the same time. The mechanical global shutter can also be closed, thus shielding pixels in the sensor array from light at the same time.

The global shutter may be an electronic shutter, such as a liquid crystal display (LCD) shutter, that has an alterable translucent state. An electronic global shutter may have sensors implementing a global shutter timing mechanism for the light sensitive pixels. These sensors have electronic components added to each pixel location in the sensor array.

Typically, in a sensor array implementing a global shutter timing mechanism, all of the pixels may or may not begin integration at the same time but all of the pixels do integrate over a common interval of time. Therefore, sensors employing a global shutter timing mechanism typically have little potential for motion artifacts.

The sensor array 102, such as an N mega pixel complementary metal-oxide semiconductor (CMOS) sensor, may include an array of evenly spaced, discrete light-sensing elements, called pixels. "N" may be any number such as 1.3 mega pixels, where "mega" means either 1,000,000 or 2 to the 20th power. The sensor array may implement a pixel line by pixel line integration timing mechanism such as a rolling shutter timing mechanism. The digital photography device 100 may also have a flash or similar device to cause a pulsed illumination.

The global shutter 106 receives a trigger signal from a controller 108 to control the exposure of the sensor array 102 to the photographic effects of ambient light during a flash photography shot (the taking of a picture). The controller 108 is a logic unit that may be external to the sensor array 102 as drawn in FIG. 1. The controller 108 may also be integrated with the sensor array 102. The sensor array 102 and controller 108 can be positioned on a printed circuit board (PCB). The global shutter 106 controls or reduces the amount of blur or ghosting images in the resultant captured digital image by reducing the negative potential photographic effects of potential movement of objects within that picture frame of time while the digital image is taken.

In order to determine the proper amount of flash during the taking of a picture, a pre-flash illumination may be used. The controller 108 measures the illumination level using the sensor array 102 before and during the pre-flash illumination. The controller 108 may use the ratio of the illumination level before and the illumination level during a pre-flash illumination to determine a proper power to be applied to the flash during the image capture. Alternatively, the controller 108 may determine the proper power based on a derivative of the illumination level before the pre-flash illumination and the integral of the illumination level during the pre-flash illumination.

Once the illumination level before and during pre-flash illumination has been measured, the power to be applied to the flash illumination during the taking of picture can be accurately predicted in order to produce high quality digital images. The controller 108 triggers the global shutter 106 to transition between an open state and a closed state such that the shutter speed during the pre-flash illumination substantially matches the shutter speed during the flash illumination. If the shutter speeds during the pre-flash illumination and during the flash illumination do not substantially match, then the proper flash illumination may not be as accurately predicted, leading to lower quality pictures. The controller 108 may also trigger the global shutter 106 prior to the pre-flash illumination at a shutter speed substantially matching the shutter speed during the pre-flash and flash illuminations.

The sensor array 102 may have a limited dynamic range, which is the ideal operating range, or optimum operating range of the sensor array 102. Portions of the sensor array may become overexposed with light and clip if too much light is exposed to pixels in the sensor array 102. Conversely, portions of the sensor array may become underexposed if an insufficient amount of flash illumination is applied during the picture. Substantially matching the shutter speeds within a factor of two during the pre-flash and flash illuminations reduces clipping and keeps the sensor array operating within an optimum range leading to high quality pictures.

Figure 2:
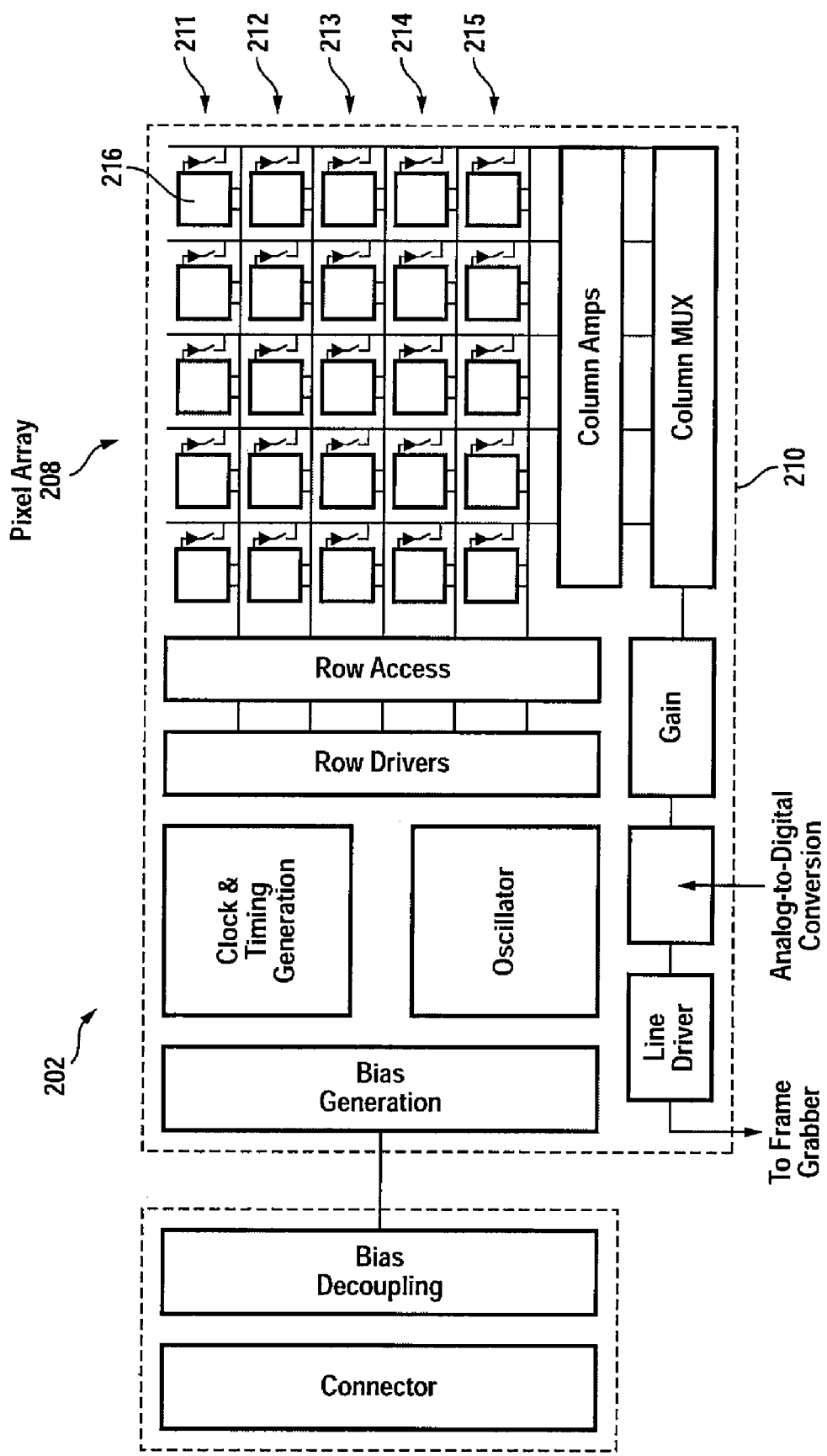
FIG. 2 illustrates a block diagram of an embodiment of an example semiconductor sensor circuit.

FIG. 2 illustrates a block diagram of an embodiment of an example semiconductor sensor circuit. The sensor array 202 may include an array of pixels 208 and circuitry 210 to direct the operation of the pixels. The pixels may be organized into lines of pixels 211-215 aligned horizontally across the light sensitive portion of the sensor array 202. Each pixel, such as a first pixel 216, acts as an optoelectronic converter because a pixel becomes electrically "charged" to a level directly proportional to the amount of light that strikes the pixel during a given time period, called the integration time. The circuitry 210 directs the overall integration time including the timing of when each pixel should start tracking the accumulated light striking that pixel. The global shutter is positioned in an optical path between the incoming light and the sensor array 202 to cooperate with the rolling shutter timing mechanism to control the exposure time for all of the lines of pixels 211-215 in the sensor array 202. The accumulated charge from light striking each pixel in the lines of the pixels 211-215 may read out line by line. After a line is read out completely, that line may be put into a reset state.

Thus, the pixel array 208 captures an image by converting the light from objects in the picture frame into an electrical charge stored by those pixels 211-215 which make up the pixel array 208. The amount of the electrical charge stored by each pixel depends on the amount of light that falls on that pixel, both in terms of intensity and duration.

The sensor array 202 implements a rolling shutter timing mechanism such that the light accumulating pixels in the sensor both track the accumulation of charge and are read out in a pixel line by pixel line manner. The beginning of the integration time for each pixel is the moment in time in which that pixel begins the accumulation of charge by converting light. The lines/rows of pixels 211-215 in the sensor array 202 begin the integration time in sequential order. The pixel array 208 accumulates light from the objects in the picture frame starting at the top of the image and proceeds line by line to the bottom of the image. When the integration process has moved some distance down the image, the read out process of lines of pixels begins. The lines of pixels 211-215 are read out in sequence, starting at the top of the image and proceeding line by line to the bottom. The time period between a first row of pixels 211 starting the accumulation of charge and a last row of pixels 215 starting to be read may be considered the integration time.

Each photo-site in the sensor array 202 may have its own amplifier and output circuitry to allow each photo-site to be read out independently of the other photo-sites. The rolling shutter timing mechanism may reduce the number of in-pixel transistors, thus improving the fill factor.

FIG. 3 illustrates a graph of an embodiment of lines of pixels in the sensor array accumulating charge from light striking the pixels in the lines of the array versus time for a shutter implementing a rolling timing mechanism. An example six scan lines of pixels 311-316 may be present in a frame of a picture. The sensor circuitry may stagger the sequential analysis of each line of pixels 311-316. The sensor circuitry may also stagger the starting point of when each line of pixels 311-316 keeps track of and accumulates charge from incoming light. The six scan lines 311-316 may sequentially start one right after another. A first scan line 311 may start to track the accumulation of light at the beginning of the integration time 320. A second scan line 312 may start to track the accumulation of light in the pixels in that line a short time later. The process may continue for all of the remaining lines of pixels 313-316 in the sensor. When the last line of pixels, for example the sixth line 316, stops tracking the accumulation of charge, that may be the end of the integration time 322. Each frame (captured image) will be a composite of the horizontal scan lines 311-316 going across the sensor.

The shutter 326 and the sensor circuitry implementing the rolling shutter timing mechanism work together to capture the proper amount of light needed to make a high quality digital image. The time period 324 between the dashed lines indicates a segment in time where a picture is taken when a device such as a flash creates a pulsed illumination. The shutter 326 controls the sensor array's exposure to the photographic effect of ambient light during the pulsed illumination picture in order to reduce blur and ghost imaging in a resultant digital image. The shutter 326 transitions from an opaque state 327 (i.e. closed state) at approximately the beginning of the integration time 320 to a translucent state 328 (i.e. open state) at approximately the occurrence of the pulsed illumination when the picture is being taken. The accumulated light from the horizontal scan lines 311-316 from the beginning of the integration time 320 to the end of the integration time 322 may be processed to create a digital file of the digital image. Note, a digital camera implementing a mechanical global shutter will also transition between closed and open states to create the time period 324.

FIG. 4 illustrates a graph of an embodiment of lines of pixels in the sensor array accumulating charge when the picture is being taken versus time for a shutter implementing a global reset mechanism. The shutter and the circuitry controlling the tracking of accumulated charge in the pixels may be timed such that when the shutter is in a translucent state 428 passing the incoming light to the sensor, the horizontal scan lines 411-415 for the frame all start tracking of their individual accumulation charge starting at approximately that same time rather than being staggered. The dashed line 424 indicates a segment in time where a picture is taken when a device such as a flash creates a pulsed illumination and a correspondingly timed shutter is in a translucent state 428 to pass a significant amount of light to the sensor. The first scan line 411 processes light from objects within the frame while the shutter is in this translucent state. However, starting at the second pixel line 412 down to the fifth scan line 415, the CMOS sensor continues to process or gain accumulated light information from these scan lines. The second pixel line 412 through the fifth pixel line 415 keep receiving input from light reflecting off of the objects in the image. The opaque state 427 prevents this extra information from causing a blurriness or ghost imaging on the resultant digital image.

Figure 5:
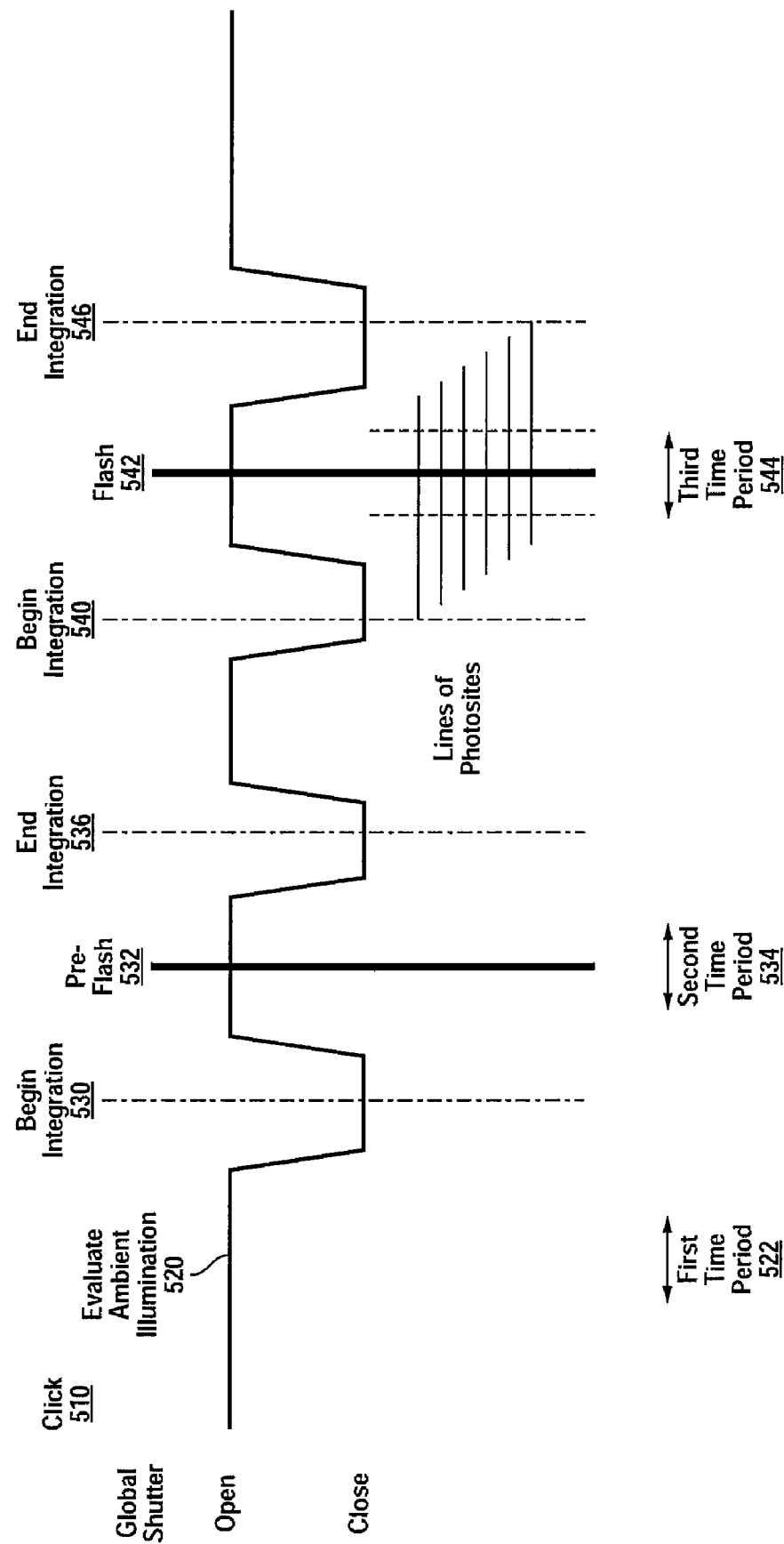
FIG. 5 illustrates an example sequence of operations for an embodiment of the digital photography device having a global shutter that closes four times.

FIG. 5 illustrates an example sequence of operations for an embodiment of the digital photography device having a global shutter that closes four times. The controller measures the ambient light arriving at the sensor array during a first time period 522 to evaluate ambient illumination 520 in response to a user depressing the shutter release button at click 510. The global shutter may be in a nominal open state as illustrated in FIG. 5. In this case, an electronic shutter or other logic resets the sensor array just prior to the first time period 522. Alternatively, the controller may simply retrieve a preset amount of pixel data from a buffer that continuously stores the lighting condition data in order to generate the first time period 522.

The global shutter may also be in a nominal closed state. In this case, the global shutter transitions to an open state for the first time period 522 in response to click 510. The controller evaluates the ambient illumination and determines whether flash will be needed in order to set the overall exposure level, from flash and ambient illumination, within a narrow range of illumination, so that the sensor array is operating in its optimum range.

The controller evaluates the light data from the first time period 522 to determine if a flash illumination is required to generate a quality picture. If flash is required, the global shutter transitions to a closed state and the sensor array begins integration 530. Next, the global shutter transitions to an open state with a pre-flash illumination 532 being fired during a second time period 534. The beginning of the second time period 534 coincides with the global shutter transitioning to a fully open state. A pre-flash illumination 532 may be a pulsed illumination from the flash at a fraction of the full power level of the flash such as 10 to 25% of full power.

Then, the global shutter transitions to a closed state and the sensor array ends integration 536. Integration is the time period during which the accumulation of charge on the pixels of the sensor array is measured. An electronic global shutter or other logic may reset the sensor array at begin integration 530 and terminate integration by stopping the accumulation of charge at end integration 536.

The controller measures the combination of pre-flash illumination and ambient illumination arriving at the sensor array during the second time period 534. The controller stores the ambient illumination data corresponding to the first time period 522 and the ambient and pre-flash illumination data corresponding to the second time period 534. The controller calculates the additional illumination needed for the flash by comparing the illumination measured before and during pre-flash illumination corresponding to the first time period 522 and the second time period 534. In an embodiment, the controller calculates the ratio between the illumination measured before and during pre-flash illumination corresponding to the first time period 522 and the second time period 534. The global shutter speed may be different during the first time period 522 and the second time period 534. However, the global shutter speed will be substantially similar between the second time period 534 and the third time period to come.

The global shutter may screen light from a perimeter area of the sensor array that is less than half the total area of the sensor array before and during the pre-flash illumination. Alternatively, the controller may ignore light measured from a perimeter area of the sensor array that is less than half the total area of the sensor array before and during the pre-flash illumination. Ignoring some of the data allows a faster calculation of the light in the picture.

The sensor array may implement the rolling shutter timing mechanism during integration, which starts with an algorithm directing the sensor array to capture or pay attention to the amount of light being exposed to the sensor array in order to process that data to generate a resultant digital image. Lines of photo sites (pixels) of the sensor array are processed in sequential order in a staggered manner as previously discussed. After begin integration 540 is started, the algorithm directs the global shutter to transition to an open state during a third time period 544. The beginning of the third time period 544 coincides with the global shutter transitioning to a fully open state. The controller generates a flash 542, a pulsed illumination, during the third time period 544. The global shutter begins its transition to a closed state at the end of the third time period 544 in order to end the exposure for the sensor array being exposed to the light. Next, after the last pixel line for that particular frame has been received and processed, that signifies the end integration 546. The sensor array no longer pays attention to the amount of incoming light in order to generate a resultant digital image. The electronic shutter or other logic may reset the sensor array at begin integration 540 and terminate integration by stopping the accumulation of charge at end integration 546. The controller measures the flash illumination and then stores the flash illumination data. The controller processes all the stored flash illumination data in order to generate the resultant digital image. The global shutter may then transition once again to its open state and evaluate ambient illumination again for the next digital photography picture to be taken if a user depresses the shutter release button.

The controller adjusts the power of the flash 542 to set the exposure within a predefined range of illumination, so that the sensor array is within its optimum operating range. The controller makes these adjustments based on a function of the illumination measured before and during the pre-flash illumination corresponding to the first time period 522 and the second time period 534. The shutter speed of the global shutter during the pre-flash illumination substantially matches the shutter speed during the flash illumination by being within a factor of one and half to two times the shutter speed during the flash illumination. The controller accurately predicts the flash illumination needed to operate the sensor array within an optimum range leading to high quality pictures based on substantially matching the shutter speeds during the second time period 534 and the third time period 544. The shutter speed of the global shutter during the first time period 522 may also substantially match the shutter speed during the second time period 534 and the third time period 544. Matching the shutter speeds or equivalently matching the exposure time periods leads to the accurate prediction of the flash 542 that leads to operating the sensor array within its optimum range in order to generate high quality digital images.

If the controller determines that flash is not required, then the global shutter transitions from the open state at evaluate ambient illumination 520 to the closed state at begin integration 540. The global shutter opens during the third time period 544 with no flash being fired. The sensor array implements the rolling shutter timing mechanism during integration of the digital image as previously discussed.

The operations in FIG. 5 can be implemented with the global reset timing mechanism previously discussed in connection with FIG. 4. The operations and timing sequence of the global shutter described in FIG. 5 with a rolling timing mechanism are similar with a global reset timing mechanism.

Figure 6:
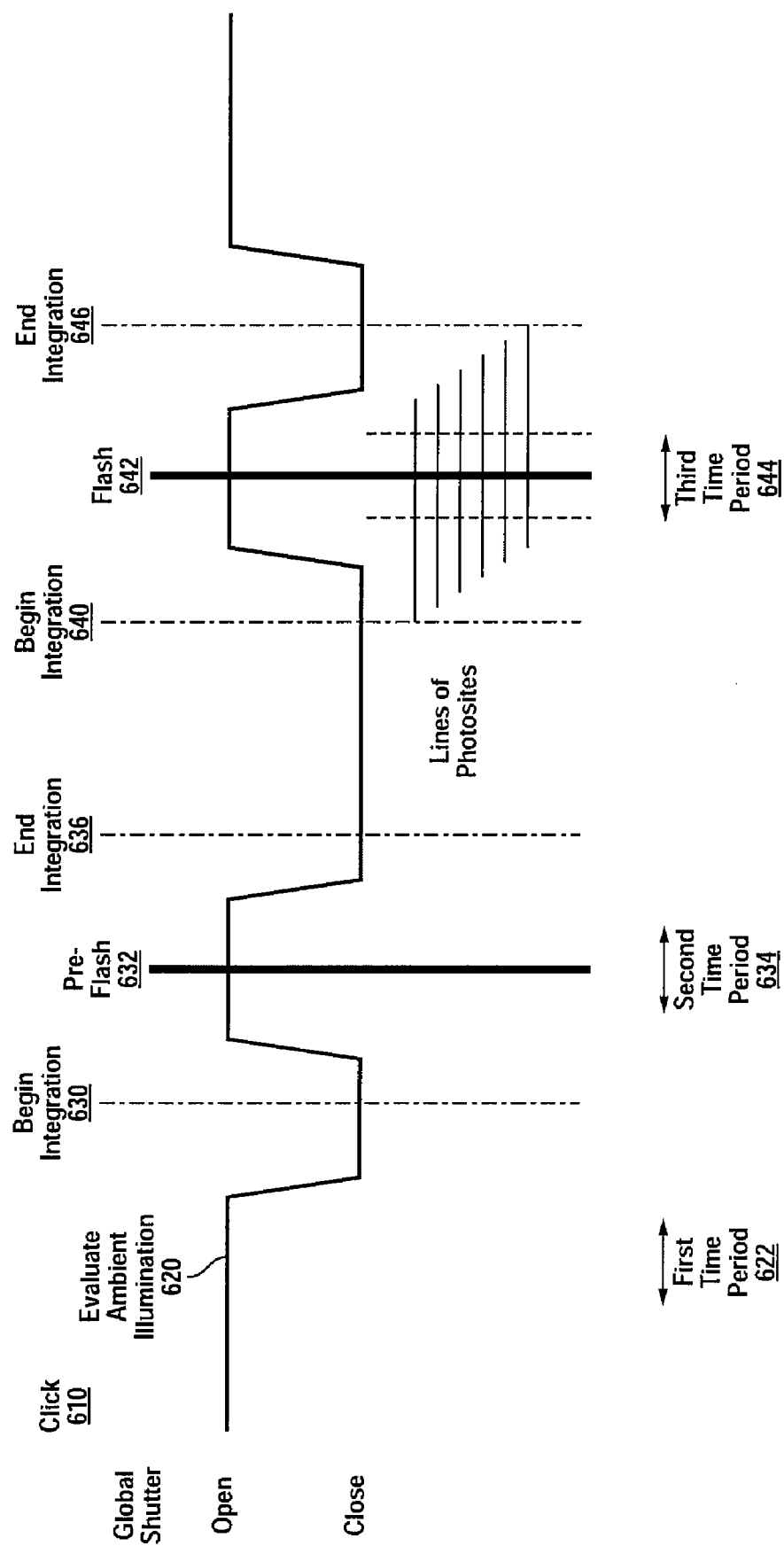
FIG. 6 illustrates an example sequence of operations for an embodiment of the digital photography device having a global shutter that closes three times.

FIG. 6 illustrates an example sequence of operations for an embodiment of the digital photography device having a global shutter that transitions from an open state to a closed state three times. The operations of FIG. 6 are similar to the operations of FIG. 5, except that the global shutter transitions to the closed state merely three times in FIG. 6. The global shutter in FIG. 5 transitions from a closed state at end integration 536 to an open state to a closed state at begin integration 540. The global shutter in FIG. 6 has no transitions from end integration 636 to begin integration 640.

In FIG. 6, a user depresses a shutter release button at click 610. The controller measures and stores the ambient illumination at evaluate ambient illumination 620 during a first time period 622. The global shutter transitions to a closed state and begin integration 630 occurs. The global shutter transitions to an open state. Then, a pre-flash illumination 632 is pulsed during a second time period 634. The second time period ends concurrently with the start of the global shutter transitioning to a closed state. The global shutter transitions to a closed state just prior to end integration 636. Then, the sensor array is reset and begin integration 640 occurs with the global shutter still in a closed state. Flash 642 is fired after the global shutter transitions to an open state during a third time period 644. The global shutter transitions to a closed state just prior to end integration 646. The shutter may then transition once again to its open state and evaluate ambient illumination again for the next digital photography picture to be taken if a user depresses the shutter release button.

Using the global shutter during the second time period 634 with pre-flash and the third time period 644 with flash at substantially matching shutter speeds allows the controller to accurately predict the amount of additional illumination needed during flash to operate the sensor array within an optimum range. The shutter speed of the global shutter during the first time period may also substantially match the shutter speed during the second and third time periods.

Thus, if the shutter speeds are approximately the same between the second and the third time periods, then the main variable to scale when determining the amount of additional light needed to generate a quality picture is merely the percent power applied to the flash illumination. If, for example, 15% of full power was applied to the flash during the pre-flash illumination and the controller calculates that approximately four times that amount of flash-added light is needed to generate a quality picture, then the controller causes the flash to generate a pulsed illumination at 60% of full power during the image capture.

Figure 7:
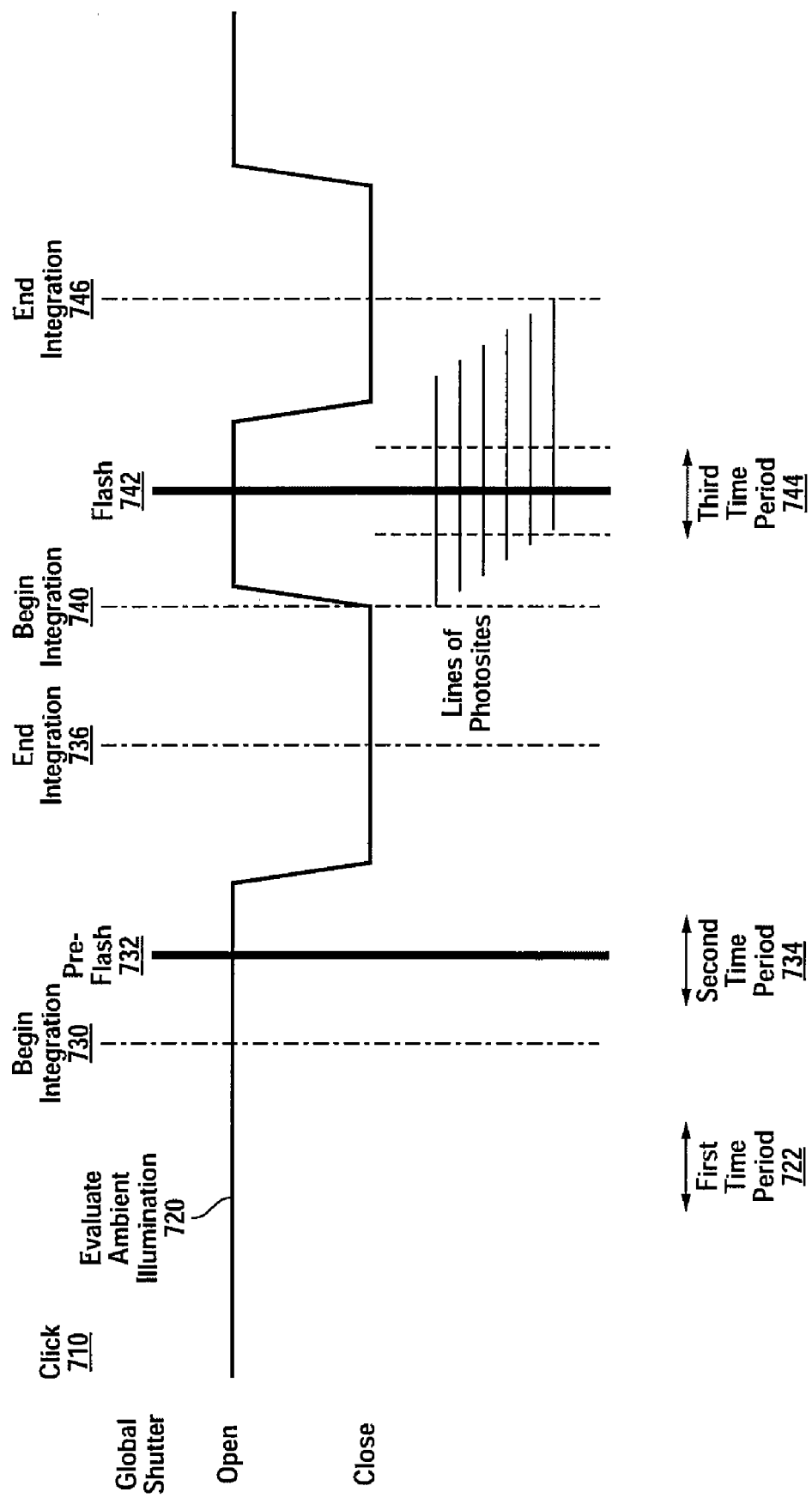
FIG. 7 illustrates an example sequence of operations for an embodiment of the digital photography device having a global shutter that closes two times.

FIG. 7 illustrates an example sequence of operations for an embodiment of the digital photography device having a global shutter that closes two times. The operations of FIG. 7 are similar to the operations of FIG. 6, except that the global shutter transitions to a closed state merely two times in FIG. 7. The global shutter in FIG. 6 transitions from an open state at evaluate ambient illumination 620 to a closed state at begin integration 630 to an open state for pre-flash 632. However, the global shutter in FIG. 7 has no transitions from evaluate ambient illumination 720 to begin integration 730 to pre-flash 732.

In FIG. 7, a user depresses a shutter release button at click 710. The controller measures and stores the ambient illumination at evaluate ambient illumination 720 during a first time period 722. Next, the sensor array is reset and begin integration 730 occurs. Then, a pre-flash illumination 732 is generated during a second time period 734. The end of the second time period 734 occurs contemporaneously with the beginning of the global shutter's transition to a closed state. The global shutter transitions to a closed state and end integration 736 occurs. Then, the sensor array is reset and begin integration 740 occurs with the global shutter transitioning to an open state. A flash illumination 742 is generated during a third time period 744. The end of the third time period 744 may occur contemporaneously with the beginning of the global shutter's transition to a closed state. The global shutter transitions to a closed state and end integration 746 occurs. The shutter may then transition once again to its open state and evaluate ambient illumination again for the next digital photography picture to be taken if a user depresses the shutter release button.

Using the global shutter during the second time period 734 with pre-flash and the third time period 744 with flash at substantially matching shutter speeds allows the controller to accurately predict the amount of additional illumination needed from the flash during image capture to operate the sensor array within an optimum range. The shutter speed of the global shutter during the first time period may also substantially match the shutter speed during the second and third time periods.

Figure 8:
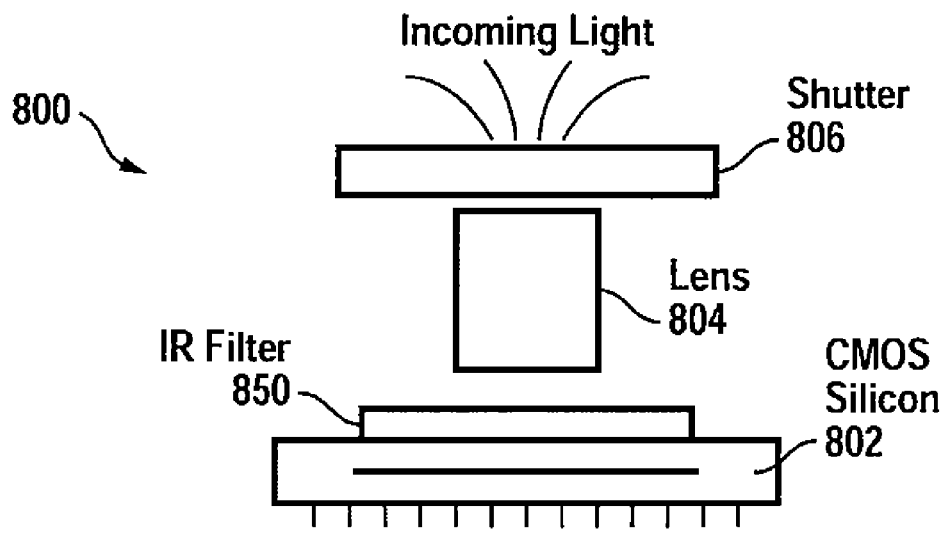
FIG. 8 illustrates an assembly diagram of an embodiment of the global shutter in the optical path of input light going to the sensor array.

FIG. 8 illustrates an assembly diagram of a partial embodiment of the global shutter in the optical path of input light going to the sensor. The global shutter 806 is placed prior to the lens 804. The lens 804 is placed prior to an infrared filter 850 that is bonded to the sensor 802. The digital photography device 800 may be a digital camera, a one-time use digital camera, a cellular phone operable to take digital pictures, or other similar device.

Figure 9:
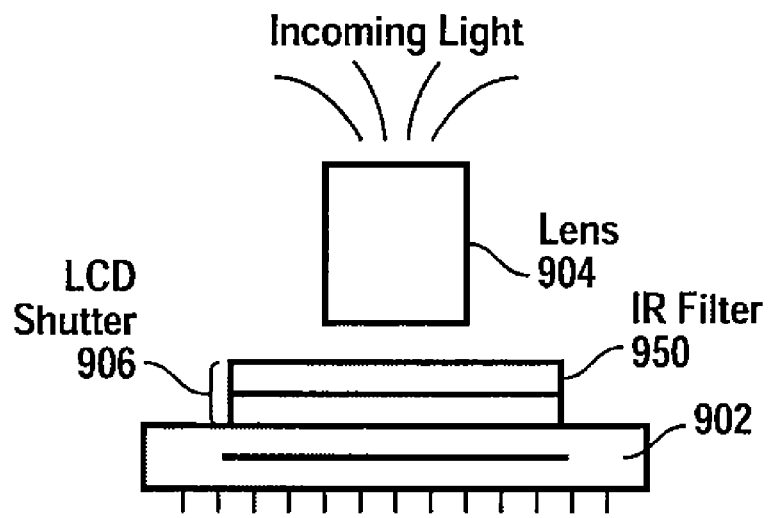
FIG. 9 illustrates an assembly diagram of a light path in an embodiment of the digital photography device.

FIG. 9 illustrates an assembly diagram of a light path in an embodiment of the digital photography device. A lens 904 is placed in the optical path prior to an infrared (IR) filter 950, a LCD shutter 906 and a CMOS silicon sensor 902 implementing the rolling shutter timing mechanism. In an embodiment, the LCD shutter 906 may be an integral unit with the IR filter 950.

Figure 10:
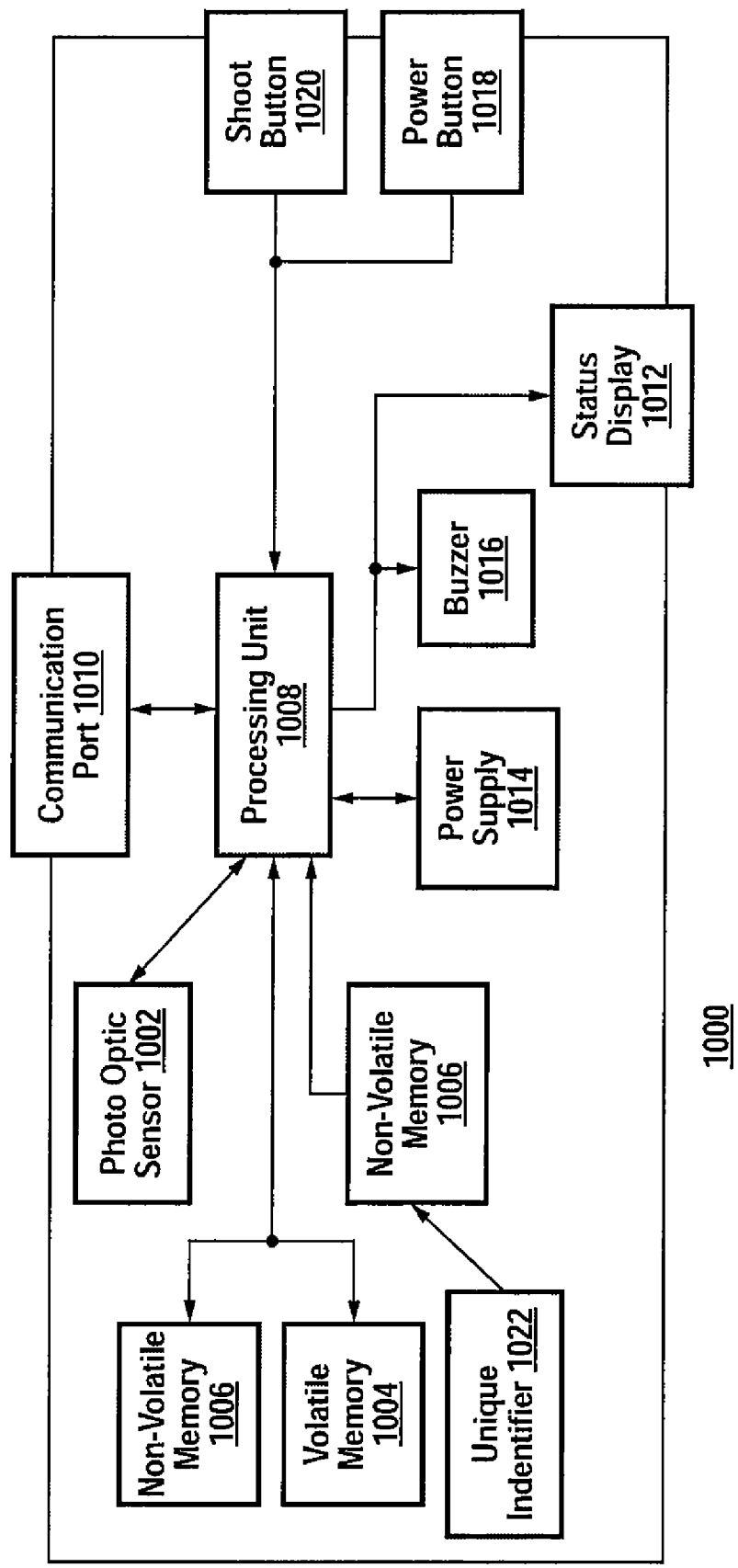
FIG. 10 illustrates an embodiment of a block diagram of a Digital One-Time-Use-Camera (Digital OTUC)

FIG. 10 illustrates an embodiment of a block diagram of a Digital One-Time-Use-Camera (Digital OTUC). In an embodiment, the digital OTUC 1000 may have a photo optic sensor 1002, such as 1280×1024 Pixel complementary metal oxide semiconductor (CMOS) or a charge coupled device (CCD) sensor, volatile memory 1004, such as eight Megabytes of Synchronous Dynamic Random Access Memory, non-volatile memory 1006, such as four Megabytes of internal flash memory and/or five hundred and twelve kilobytes of Read Only Memory, a processing unit 1008, such as a micro-controller or controller, one or more communication ports 1010, such as a proprietary Universal Serial Bus-based interface, an optical view finder 1024, a focus lens 1026, such as a fixed focus lens, a status display 1012, such as a multi-segment status liquid crystal display (LCD), a power supply 1014, such as batteries, an audio indicator 1016, such as a buzzer 1016, a power button 1018 such as an On/Off button with automatic power-off on idle, a shutter release ("Shoot") button 1020, a reset mechanism 1021, an internal casing 1028, and an external casing 1030.

In an embodiment, the processing unit 1008 executes the firmware instructions stored in the non-volatile memory 1006 such as Read Only Memory and copies the instructions to the volatile memory 1004 for execution. The processing unit 1008 controls the operation of the digital OTUC 1000. The processing unit 1008 may use portions of the volatile memory 1004 to convert the data array information into an image format, such as a Joint Photographic Experts Group format. The raw image data is then stored in the non-volatile memory 1006. The power supply 1014 activates components within the digital OTUC 1000 but once the image is captured and stored in a non-volatile memory 1006, then the power supply 1014 is no longer required to maintain the captured image data.

In an embodiment, the communication port 1010 facilitates communications between the components internal to the digital OTUC 1000 and devices external to the digital OTUC 1000. Also, the communication port 1010 may receive a reset signal to allow the digital OTUC 1000 to be used for another cycle. A proprietary mechanism, such as a key, may communicate a physical or electronic signal through the communication port 1010 to reset the digital OTUC 1000 for another cycle. The status display 1012 visually communicates information, such as the number of pictures left to be taken, low lighting conditions, and other similar information.

Figure 11:
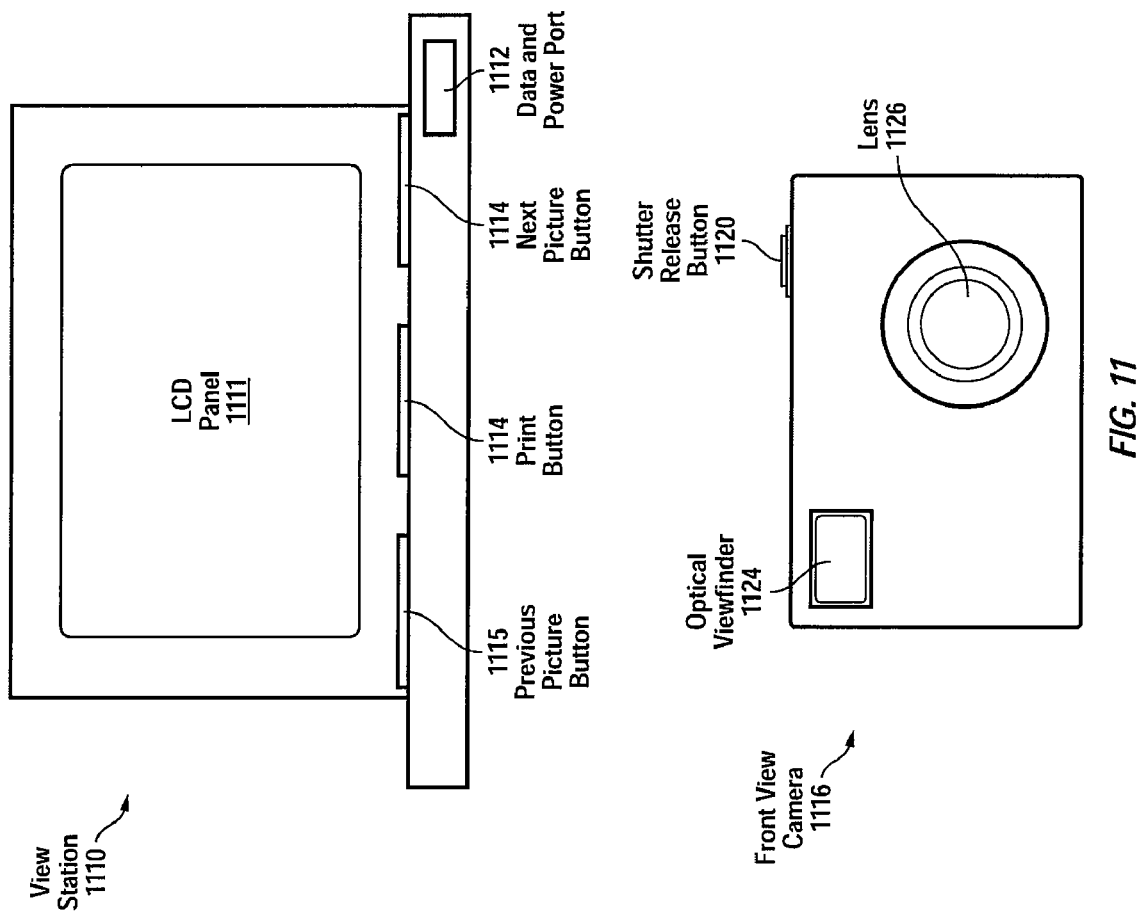
FIG. 11 illustrates an embodiment of a physical diagram of a camera and a view station.

FIG. 11 illustrates an embodiment of a physical diagram of a camera and a view station. A camera 1116 is used to take picture(s) using a global shutter with substantially the same shutter speed during pre-flash and flash illumination in order to operate the sensor array within an optimum range. The camera 1116 may be any type of image capture device that captures and stores (or communicates) digital images, such as a digital camera, a one-time use digital camera, the digital OTUC 1000, a cellular phone operable to take digital pictures, etc. The camera 1116 may capture images in any of a variety of conventional manners. Camera 1116 may include optical viewfinder 1124, shutter release button 1120, and lens 1126. The optical viewfinder 1124 allows a user to see the image of the photo to be taken and to target that area.

In an embodiment, the view station 1110 may contain Status display such as, a color LCD display 1111, non-volatile memory such as 128K of ROM for firmware, volatile memory such as 8 MB of SDRAM, a micro-controller for firmware execution, a data and power port 1112 for camera cradle connection, a data and power cable for external processing unit connection (not shown), a buzzer, and several user operation buttons such as a Next picture button 1113, a Previous picture button 1115, a print picture button 1114, a mouse, or other similar buttons/input devices.

The view station 1110 may be used for picture viewing and printing selection. The view station 1110 may be designed for use by the consumer and may be located over the counter. The view station 1110 may be connected to an external processing unit with an appropriate type of cable. The view station 1110 may include a color LCD display and a user interface for image browsing and print selection.

Figure 12:
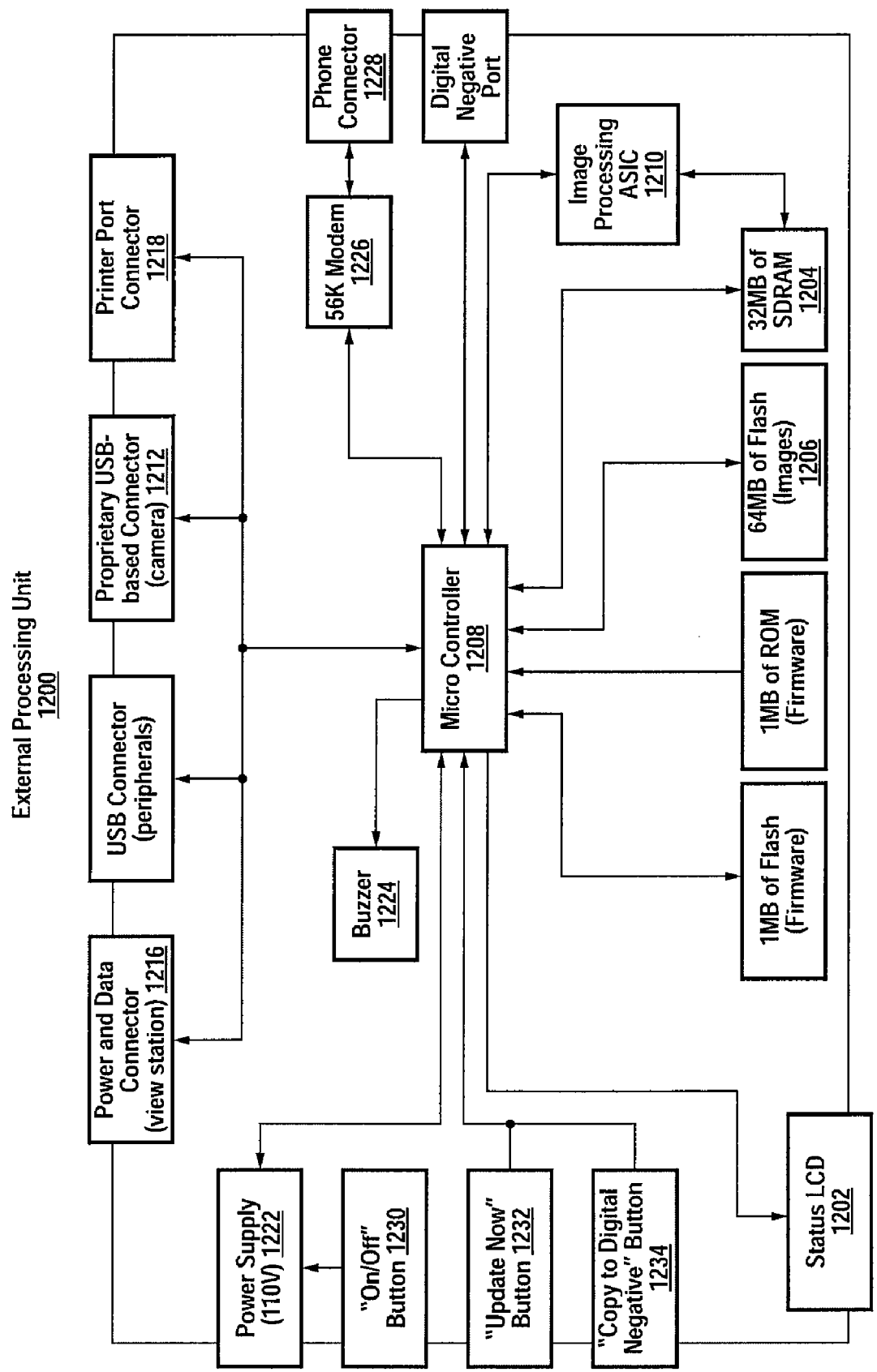
FIG. 12 illustrates a block diagram of an embodiment of an external processing unit.

FIG. 12 illustrates a block diagram of an embodiment of an external processing unit. In an embodiment, the external processing unit 1200 may contain a status display 1202, such as Multi-segment status LCD, volatile memory 1204, such as 32 MB of Synchronous DRAM, non-volatile memory 1206 such as 64 MB of internal flash memory, a processing unit 1208 such as a Micro-controller for firmware execution, an image processing ASIC 1210, a proprietary interface 1212 for the digital OTUC, a standard port for peripherals and maintenance, a data and power port 1216 for a view station connection, a printer port 1218, a digital memory port for removable or portable memories such as a CompactFlash, SmartMedia or Memory Stick, a power supply 1222, a buzzer 1224, a modem 1226, a phone connection 1228, and several operation buttons such as a power button 1230, an update now button 1232, a copy to digital negative button 1234, and other similar buttons.

The external processing unit 1200 may be located as a retail-location device that enables the digital OTUC to get connected to other digital devices such as monitor, printers, email, etc. The external processing unit 1200 may have several functions such as reading the data out of the digital OTUC, processing the image data and improving the quality of the image data such as reducing redeye in the digital images, and connecting the images with other devices. The external processing unit receives the sensor's data and then performs image processing operations on the data to convert the data to a formatted graphics file of a captured digital image.

The external processing unit 1200 may use a proprietary USB-based connection to read the pictures off the digital OTUC and store it in its internal non-volatile memory 1206. Once the pictures are stored in its internal non-volatile memory 1206 the external processing unit 1200 processes the images and performs a series of procedures to ensure that the image quality is as high as possible. Once the processing stage is complete the image data is ready to be used by other devices such as a view station, a modem 1226, a printer, a photo finishing Mini-lab, a computer or any other similar device.

The external processing unit 1200 includes two docking bays: one for the digital OTUC and the other for removable digital storage media (called a Digital Negative). The external processing unit 1200 may be designed for use by the clerk in the retail location or by the consumer in a self service model.

A machine readable medium may be contained within a processing unit and the processing unit receives the digital image from a one time use digital camera. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; CD-ROM, DVD's, electrical, optical, acoustical or other form of propagated signals (e.g., carrier waves, infrared signals, digital signals, Electrically Programmable ROMs, Electrically Erasable PROMs, FLASH memory, magnetic or optical cards, or any type of media suitable for storing electronic instructions.

While some specific embodiments of the invention have been shown the invention is not to be limited to these embodiments. For example, most functions performed by electronic hardware components may be duplicated by software emulation. Thus, a software program written to accomplish those same functions may emulate the functionality of hardware components in the sensor circuitry. The global shutter may be mechanical or electronic. The sensor may be a CMOS sensor, a CCD sensor, or other similar sensor. The flash source of the pulsed illumination may be internal or external to the digital photography device. The invention is to be understood as not limited by the specific embodiments described herein, but merely by the scope of the appended claims.

What is claimed is:

1. A digital photography device comprising:
   a sensor array configured to receive light from an object propagating along an optical path;
   a mechanical global shutter disposed in the optical path and characterized by a first shutter speed implemented during a pre-flash illumination period that is substantially equal to a second shutter speed implemented during a flash illumination period, wherein shutter speed measures how quickly the mechanical global shutter opens and closes to begin and end exposing the sensor array to light;
   a flash configured to generate pulsed illumination; and
   a controller in electrical communication with the flash, wherein the controller is configured to provide a trigger signal to the flash.

2. The digital photography device of claim 1 wherein the mechanical global shutter is positioned between the object and the sensor array.

3. The digital photography device of claim 1 wherein the controller is configured to provide a trigger signal to the mechanical global shutter during an ambient light period prior to the pre-flash illumination period.

4. The digital photography device of claim 3 wherein the controller is configured to determine a power level provided to the flash during the flash illumination period based on a ratio of an illumination level of the sensor array during the ambient light period and an illumination level of the sensor array during the pre-flash illumination period.

5. The digital photography device of claim 1 wherein the sensor array comprises a complementary metal-oxide semiconductor sensor implementing a rolling shutter timing mechanism.

6. The digital photography device of claim 1 wherein the digital photography device is a component of at least one of a digital camera, a one-time use digital camera, or a cellular phone.

7. The digital photography device of claim 6 wherein the one-time use digital camera further comprises an external processing unit configured to:
   receive data from the sensor array;
   perform image processing operations on the received data; and
   convert the processed data to a formatted graphics file associated with a captured digital image.

8. The digital photography device of claim 1 wherein the controller is configured to adjust a power level provided to the flash during the flash illumination period based on an illumination level of the sensor array measured during the pre-flash illumination period.

9. The digital photography device of claim 1 wherein the controller is configured to measure an illumination level of the sensor array during an ambient condition and during the pre-flash illumination period.

10. The digital photography device of claim 9 further comprising a memory configured to store the illumination levels during the ambient condition, the pre-flash illumination period, and the flash illumination period.

* * * * *